US008050661B2

(12) United States Patent
Mousseau et al.

(10) Patent No.: US 8,050,661 B2
(45) Date of Patent: **\*Nov. 1, 2011**

(54) SYSTEM AND METHOD FOR REDIRECTING MESSAGE ATTACHMENTS BETWEEN A HOST SYSTEM AND A MOBILE DATA COMMUNICATION DEVICE

(75) Inventors: Gary P. Mousseau, Waterloo (CA); Mihal Lazaridis, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1016 days.

This patent is subject to a terminal disclaimer.

(21) Appl. No.: 11/925,754

(22) Filed: Oct. 27, 2007

(65) Prior Publication Data
US 2008/0045216 A1 Feb. 21, 2008

Related U.S. Application Data

(63) Continuation of application No. 10/151,642, filed on May 20, 2002, now Pat. No. 7,509,376, which is a continuation of application No. 09/761,480, filed on Jan. 16, 2001, now Pat. No. 6,438,585, which is a continuation-in-part of application No. 09/087,623, filed on May 29, 1998, now Pat. No. 6,219,694, and a continuation-in-part of application No. 09/545,963, filed on Apr. 10, 2000, now Pat. No. 6,779,019.

(51) Int. Cl.
*H04L 12/58* (2006.01)

(52) U.S. Cl. .................... 455/412.1; 455/412.2; 709/203

(58) Field of Classification Search ............... 455/412.1, 455/524; 709/203, 206, 232
See application file for complete search history.

(56) References Cited

U.S. PATENT DOCUMENTS 4,763,291 A * 8/1988 Schwaber ................. 708/104
4,994,985 A 2/1991 Cree et al.
5,239,466 A 8/1993 Morgan et al.
(Continued)

FOREIGN PATENT DOCUMENTS
EP 0 950 969 10/1999
(Continued)

OTHER PUBLICATIONS

EPO Search Report, Application No. 09172351.0, European Patent Office, Dec. 4, 2009, 8 pgs.
(Continued)

*Primary Examiner* — Kamran Afshar
*Assistant Examiner* — Shahriar Behnamian
(74) *Attorney, Agent, or Firm* — The Danamraj Law Group, P.C.

(57) ABSTRACT

A scheme for redirecting e-mail messages and message attachments from a mail system to a mobile data communication device. In one embodiment, a method comprises one or more of the following: automatically detecting a data item including an e-mail message and a message attachment by a redirector component associated with the mail system, processing the data item for sending a first portion of the data item to the mobile data communication device via a wireless network, receiving a command message from the mobile data communication device at the redirector component requesting more of the data item, and sending a second portion of the data item including the message attachment to a user of the mobile data communication device in response to the command message.

18 Claims, 9 Drawing Sheets

U.S. PATENT DOCUMENTS

| | | | |
|---|---|---|---|
| 5,283,887 A | 2/1994 | Zachery | |
| 5,410,543 A | 4/1995 | Seitz et al. | |
| 5,418,908 A | 5/1995 | Keller et al. | |
| 5,577,202 A | 11/1996 | Padgett | |
| 5,647,002 A | 7/1997 | Brunson | |
| 5,675,507 A | 10/1997 | Bobo, II | |
| 5,675,733 A | 10/1997 | Williams | |
| 5,706,211 A | 1/1998 | Beletic et al. | |
| 5,739,512 A | 4/1998 | Tognazzini | |
| 5,742,905 A | 4/1998 | Pepe et al. | |
| 5,748,619 A * | 5/1998 | Meier | 370/278 |
| 5,754,778 A | 5/1998 | Shoujima | |
| 5,758,354 A | 5/1998 | Huang et al. | |
| 5,781,901 A * | 7/1998 | Kuzma | 1/1 |
| 5,826,023 A | 10/1998 | Hall et al. | |
| 5,838,926 A | 11/1998 | Yamagishi | |
| 5,884,033 A | 3/1999 | Duvall et al. | |
| 5,903,723 A | 5/1999 | Beck et al. | |
| 5,905,777 A | 5/1999 | Foladare et al. | |
| 5,915,087 A | 6/1999 | Hammond et al. | |
| 5,958,006 A | 9/1999 | Eggleston et al. | |
| 5,964,833 A | 10/1999 | Kikinis | |
| 5,973,612 A | 10/1999 | Deo et al. | |
| 5,987,100 A | 11/1999 | Fortman et al. | |
| 6,035,104 A * | 3/2000 | Zahariev | 709/203 |
| 6,052,563 A | 4/2000 | Macko | |
| 6,052,735 A | 4/2000 | Ulrich et al. | |
| 6,061,718 A | 5/2000 | Nelson | |
| 6,072,862 A | 6/2000 | Srinivasan | |
| 6,073,165 A | 6/2000 | Narasimhan et al. | |
| 6,092,114 A * | 7/2000 | Shaffer et al. | 709/232 |
| 6,118,856 A | 9/2000 | Paarsmarkt et al. | |
| 6,119,167 A | 9/2000 | Boyle et al. | |
| 6,128,739 A | 10/2000 | Fleming, III | |
| 6,138,146 A | 10/2000 | Moon et al. | |
| 6,157,630 A | 12/2000 | Adler | |
| 6,178,331 B1 | 1/2001 | Holmes et al. | |
| 6,182,118 B1 | 1/2001 | Finney et al. | |
| 6,185,551 B1 | 2/2001 | Birrell | |
| 6,199,102 B1 | 3/2001 | Cobb | |
| 6,205,432 B1 | 3/2001 | Gabbard et al. | |
| 6,226,668 B1 | 5/2001 | Silverman | |
| 6,240,445 B1 | 5/2001 | Kumar et al. | |
| 6,249,805 B1 | 6/2001 | Fleming, III | |
| 6,275,848 B1 | 8/2001 | Arnold | |
| 6,275,850 B1 | 8/2001 | Beyda et al. | |
| 6,289,105 B1 | 9/2001 | Murota | |
| 6,301,608 B1 | 10/2001 | Rochkind | |
| 6,304,881 B1 | 10/2001 | Halim et al. | |
| 6,360,210 B1 | 3/2002 | Wallman | |
| 6,363,412 B1 | 3/2002 | Niwa | |
| 6,381,634 B1 | 4/2002 | Tello et al. | |
| 6,389,455 B1 | 5/2002 | Fuisz | |
| 6,421,707 B1 | 7/2002 | Miller et al. | |
| 6,421,781 B1 | 7/2002 | Fox et al. | |
| 6,438,585 B2 | 8/2002 | Mousseau et al. | |
| 6,463,463 B1 | 10/2002 | Lazaridis et al. | |
| 6,463,464 B1 | 10/2002 | Mousseau et al. | |
| 6,489,347 B1 | 12/2002 | Shapiro et al. | |
| 6,526,274 B1 | 2/2003 | Fickes et al. | |
| 6,546,263 B1 | 4/2003 | Petty et al. | |
| 6,571,290 B2 | 5/2003 | Selgas et al. | |
| 6,609,196 B1 | 8/2003 | Dickinson, III | |
| 6,618,710 B1 | 9/2003 | Zondervan | |
| 6,630,883 B1 | 10/2003 | Amin et al. | |
| 6,636,965 B1 | 10/2003 | Beyda | |
| 6,650,739 B1 | 11/2003 | Doeberl et al. | |
| 6,701,378 B1 | 3/2004 | Gilhuly et al. | |
| 6,711,154 B1 | 3/2004 | ONeal | |
| 6,745,230 B1 | 6/2004 | Cao et al. | |
| 6,779,019 B1 | 8/2004 | Lazaridis et al. | |
| 6,779,022 B1 | 8/2004 | Horstmann et al. | |
| 6,781,962 B1 | 8/2004 | Williams et al. | |
| 6,914,693 B1 | 7/2005 | Kirkeby | |
| 6,981,023 B1 | 12/2005 | Hamilton et al. | |
| 6,983,308 B1 | 1/2006 | Oberhaus | |
| 7,027,568 B1 | 4/2006 | Simpson et al. | |
| 7,076,241 B1 | 7/2006 | Zondervan | |
| 7,185,058 B2 | 2/2007 | Blackwell et al. | |
| 7,209,955 B1 | 4/2007 | Major et al. | |
| 7,263,679 B2 | 8/2007 | Kuge et al. | |
| 7,509,376 B2 | 3/2009 | Mousseau et al. | |
| 2001/0013071 A1 | 8/2001 | Lazaridis et al. | |
| 2002/0002590 A1 | 1/2002 | King et al. | |
| 2004/0010621 A1 | 1/2004 | Afergan et al. | |
| 2004/0205106 A1 | 10/2004 | Adler | |
| 2005/0097174 A1 | 5/2005 | Daniell | |
| 2005/0114458 A1 | 5/2005 | Gottlieb | |

FOREIGN PATENT DOCUMENTS

| | | |
|---|---|---|
| WO | 98/00787 | 1/1998 |
| WO | 99/63709 | 12/1999 |
| WO | 02/13031 A | 2/2002 |
| WO | 03/079619 A1 | 9/2003 |

OTHER PUBLICATIONS

EPO Preliminary Examination Report, Application No. PCT/CA 03/00405, Jul. 2, 2004, 9 pgs.

EPO Written Opinion, Application No. PCT/CA 03/00405, Oct. 28, 2003; 9 pgs.

EPO Search Report; Application No. PCT/CA 03/00405, Sep. 1, 2003; 7 pgs.

EPO Communication Examination Report; Application No. 03 709 478.6; Jul. 24, 2006; 4 pgs.

S. Dusse, P. et al, "RFC 2311—S/MIME Version 2 Message Specification—Request for Comments", XP003340130 Mar. 1998, 31 pgs.

R. Troost et al, "RFC 1806—Communicating Presentation Information in Internet Messages: The Content-Disposition Header—Request for Comments," XP002250131, May 1995, 9 pgs.

AirMobile Communication Server Guide, "AirMobile Software for Lotus cc:Mail Wireless—User Guide,", V. 1.1, 1995, 24 pgs.

Allman, "SENDMAIL—An Internet Work Mail Router," 1983, 13 pgs.

Diehl, "comp.mail.sendmail, 'Need to rewrite from Field on outgoing mail,'" May 23, 1996, 2 pgs.

Gutmann, "Compressed Data Content Type for CMS," Nov. 11, 2001, 4 pgs.

US Office Action, U.S. Appl. No. 10/088,784, USPTO, Oct. 4, 2005, 29 pgs.

US Office Action, U.S. Appl. No. 10/088,784, USPTO, Jun. 22, 2006, 18 pgs.

US Office Action, U.S. Appl. No. 10/088,784, USPTO, Jan. 25, 2007, 15 pgs.

US Office Action, U.S. Appl. No. 10/088,784, USPTO, Nov. 27, 2007, 24 pgs.

US Office Action, U.S. Appl. No. 10/088,784, USPTO, Oct. 27, 2008, 15 pgs.

US Office Action, U.S. Appl. No. 10/088,784, USPTO, Apr. 3, 2009, 24 pgs.

US Office Action, U.S. Appl. No. 10/088,784, USPTO, May 14, 2010, 18 pgs.

US Office Action, U.S. Appl. No. 10/088,784, USPTO, Oct. 5, 2010, 26 pgs.

US Office Action, U.S. Appl. No. 11/849,785, USPTO, Oct. 20, 2009, 9 pgs.

US Office Action, U.S. Appl. No. 11/849,785, USPTO, Dec. 16, 2010, 9 pgs.

US Office Action, U.S. Appl. No. 11/849,785, USPTO, Mar. 26, 2010, 9 pgs.

US Office Action, U.S. Appl. No. 11/849,785, USPTO, Jun. 24, 2010, 9 pgs.

US Office Action, U.S. Appl. No. 11/925,756, USPTO, Aug. 9, 2010, 9 pgs.

US Office Action, U.S. Appl. No. 11/925,770, USPTO, Sep. 1, 2010, 8 pgs.

US Office Action, U.S. Appl. No. 11/925,775, USPTO, Aug. 20, 2010, 7 pgs.

US Office Action, U.S. Appl. No. 11/925,780, USPTO, Jul. 8, 2010, 12 pgs.

US Office Action, U.S. Appl. No. 11/925,786, USPTO, Jul. 23, 2010, 11 pgs.

US Office Action, U.S. Appl. No. 11/925,791, USPTO, Aug. 20, 2010, 9 pgs.
US Office Action, U.S. Appl. No. 11/925,813, USPTO, Oct. 2, 2019, 10 pgs.
US Office Action, U.S. Appl. No. 11/925,818, USPTO, Dec. 30, 2009, 9 pgs.
US Office Action, U.S. Appl. No. 11/925,818, USPTO, Jun. 30, 2010, 11 pgs.
US Office Action, U.S. Appl. No. 11/925,846, USPTO, Jan. 6, 2010, 8 pgs.
US Office Action, U.S. Appl. No. 11/925,846, USPTO, Aug. 12, 2010, 14 pgs.
US Office Action, U.S. Appl. No. 11/926,283, USPTO, Jan. 4, 2010, 8 pgs.
US Office Action, U.S. Appl. No. 11/926,283, USPTO, Jul. 8, 2010, 11 pgs.
US Office Action, U.S. Appl. No. 11/926,283, USPTO, Sep. 16, 2010, 10 pgs.
US Office Action, U.S. Appl. No. 11/926,355, USPTO, Aug. 19, 2010, 6 pgs.
US Office Action, U.S. Appl. No. 11/926,370, USPTO, Aug. 19, 2010, 11 pgs.
Wynd communication, "WyndMail for Windows", CE, 1997, 8 pgs.
United States Patent and Trademark Office, Office Action, U.S. Appl. No. 11/926,283, Mar. 2, 2011, 24 pgs.
United States Patent and Trademark Office, Office Action, U.S. Appl. No. 09/782,412, Mar. 16, 2011, 16 pgs.
United States Patent and Trademark Office, Office Action, U.S. Appl. No. 09/782,412, Oct. 29, 2009, 11 pgs.
United States Patent and Trademark Office, Office Action, U.S. Appl. No. 09/782,412, Apr. 28, 2009, 19 pgs.
United States Patent and Trademark Office, Office Action, U.S. Appl. No. 09/782,412, Sep. 15, 2008, 13 pgs.
United States Patent and Trademark Office, Office Action, U.S. Appl. No. 09/782,412, Jan. 28, 2008, 14 pgs.
United States Patent and Trademark Office, Office Action, U.S. Appl. No. 09/782,412, Sep. 25, 2007, 14 pgs.
United States Patent and Trademark Office, Office Action, U.S. Appl. No. 09/782,412, Apr. 10, 2007, 12 pgs.
United States Patent and Trademark Office, Office Action, U.S. Appl. No. 09/782,412, Jul. 17, 2006, 14 pgs.
United States Patent and Trademark Office, Office Action, U.S. Appl. No. 09/782,412, Sep. 22, 2005, 6 pgs.
United States Patent and Trademark Office, Office Action, U.S. Appl. No. 09/782,412, Jan. 7, 2004, 25 pgs.
United States Patent and Trademark Office, Notice of Allowance, U.S. Appl. No. 10/151,642, Jul. 11, 2007, 7 pgs.
United States Patent and Trademark Office, Office Action, U.S. Appl. No. 10/151,642, Aug. 4, 2006, 16 pgs.
United States Patent and Trademark Office, Office Action, U.S. Appl. No. 10/151,642, Nov. 28, 2005, 12 pgs.
United States Patent and Trademark Office, Office Action, U.S. Appl. No. 10/151,642, Aug. 19, 2005, 5 pgs.
United States Patent and Trademark Office, Office Action, U.S. Appl. No. 11/925,755, May 29, 2009, 16 pgs.
United States Patent and Trademark Office, Office Action, U.S. Appl. No. 11/925,755, Oct. 29, 2008, 6 pgs.
United States Patent and Trademark Office, Notice of Allowance, U.S. Appl. No. 11/925,755, Nov. 3, 2009, 7 pgs.
European Patent Office, Article 94(3) Communication, Application No. 01923431.9, Oct. 20, 2008, 5 pgs.
European Patent Office, Examination Report, Application No. 01923431.9, Feb. 16, 2007, 11 pgs.
European Patent Office, Extended Search Report, Application No. 10155075.4, May 19, 2010, 8 pgs.
Mosher, "Microsoft Exchange User's Handbook," 1997, Duke Press, 1st ed., pp. 289-292.
United States Patent and Trademark Office, Advisory Action, U.S. Appl. No. 10/151,642, Oct. 23, 2006, 3 pgs.
Canadian Intellectual Patent Office, Office Action, Application No. 2,343,648, Feb. 9, 2005, 3 pgs.
United States Patent and Trademark Office, Office Action, U.S. Appl. No. 09/761,480, Sep. 21, 2001, 20 pgs.
United States Patent and Trademark Office, Notice of Allowability, U.S. Appl. No. 09/761,480, Feb. 6, 2002, 6pgs.

* cited by examiner

SYSTEM AND METHOD FOR REDIRECTING MESSAGE ATTACHMENTS BETWEEN A HOST SYSTEM AND A MOBILE DATA COMMUNICATION DEVICE

CROSS-REFERENCE TO RELATED APPLICATIONS

This application is a continuation of U.S. patent application Ser. No. 10/151,642, titled "System and Method for Redirecting Message Attachments between a Host System and a Mobile data Communication Device", filed on May 20, 2002, now U.S. Pat. No. 7,509,376; which is a continuation of U.S. patent application Ser. No. 09/761,480, titled "System and Method for Redirecting Message Attachments between a Host System and a Mobile Data Communication Device," filed on Jan. 16, 2001, now U.S. Pat. No. 6,438,585; which is a continuation-in-part of U.S. patent application Ser. No. 09/087,623, titled "System and Method for Pushing Information from a Host System to a Mobile Data Communication Device," filed on May 29, 1998, now U.S. Pat. No. 6,219,694, and U.S. patent application Ser. No. 09/545,963, filed on Apr. 10, 2000, now U.S. Pat. No. 6,779,019. This application is also related to the following, and commonly-owned, United States patent applications, all of which are related to Ser. No. 09/087,623, now U.S. Pat. No. 6,219,694: U.S. patent applications Ser. No. 09/401,868, now U.S. Pat. No. 6,701,378, Ser. No. 09/528,495, now U.S. Pat. No. 6,463,464, Ser. No. 09/545,962, now U.S. Pat. No. 7,209,955, and Ser. No. 09/649,755, now U.S. Pat. No. 6,463,463, all of which are hereby incorporated into the present application by reference.

BACKGROUND

1. Field of the Invention

The present invention is directed toward the field of replicating and redirecting information from a host system where the information is normally stored to a mobile data communication device. In particular, the system and method of the present invention provide an event-driven redirection computer program ("redirector program") operating at the host system, which, upon sensing a particular user-defined event has occurred, redirects user-selected data items from the host system to the user's mobile data communication device. Upon sensing a second user-defined event has occurred, the redirector program may discontinue redirecting information. The mobile data communication device is preferably coupled to the host system via a wireless network and one or more landline networks. Due to the bandwidth limitations of wireless networks, only a portion of a user-selected data item is generally redirected to the user's mobile device, with the user given the option of then retrieving the entire data item (or some other portion of the data item) from the host system.

The invention also provides a system and method for redirecting message attachments between the host system and the mobile data communication device. This system and method are particularly useful for mobile devices, such as pagers, PDAs, cellular telephones, etc., that have limited memory capacity and thus may have difficulty processing attachment files.

2. Description of the Related Art

Present systems and methods for replicating (or redirecting) information from a host system to a user's mobile data communication device are typically "synchronization" systems in which the user's data items are warehoused (or stored) at the host system for an indefinite period of time and then transmitted in bulk to the mobile device only in response to a user request. In these types of systems and methods, when replication of the warehoused data items to the mobile device is desired, the user typically places the mobile device in an interface cradle that is electrically connected to the host system via some form of local, dedicated communication. Software executing on the mobile device then transmits commands via the local communications link to the host system to cause the host to begin transmitting the user's data items for storage in a memory bank of the mobile device.

In these known synchronization schemes, the mobile unit "pulls" the warehoused information from the host system in a batch each time the user desires to replicate information between the two devices. Therefore, the two systems (host and mobile) only maintain the same data items after a user-initiated command sequence that causes the mobile device to download the data items from the host system. A general problem with these synchronization systems is that the only time that the user data items are replicated between the host system and the mobile data communication device is when the user commands the mobile device to download or pull the user data from the host system. Five minutes later a new message could be sent to the user, but the user would not receive that message until the next time the user fetches the user data items. Thus, a user may fail to respond to an emergency update or message because the user only periodically synchronizes the system, such as once per day. Other problems with these systems include: (1) the amount of data to be reconciled between the host and the mobile device can become large if the user does not "synchronize" on a daily or hourly basis, leading to bandwidth difficulties, particularly when the mobile device is communicating via a wireless packet-switched network; and (2) reconciling large amounts of data, as can accrue in these batch-mode synchronization systems, can require a great deal of communication between the host and the mobile device, thus leading to a more complex, costly and energy-inefficient system.

A more automated, continuous, efficient and reliable system of ensuring that user data items are replicated at the user's mobile device is therefore needed.

There remains an additional need for such a system and method that provides flexibility in the types and quantities of user data items that are pushed from the host system to the mobile data communication device and that also provides flexibility in the configuration and types of events that can serve to trigger the redirection of the user data items.

There remains yet an additional need for such a system and method that can operate locally on a user's desktop PC or at a distance via a network server.

There remains still another need for such a system and method that provides for secure, transparent delivery of the user-selected data items from the host system to the mobile device.

There remains an additional need for such a system and method in which the user is provided with a flexible means of processing message attachments that may be too large or incompatible with the configuration of the mobile device.

SUMMARY

The present invention overcomes the problems noted above and satisfies the needs in this field for a system and method of pushing user-selected data items from a host system to a user's mobile data communication device upon detecting the occurrence of one or more user-defined event triggers. As used in this application, the term host system refers to the computer where the redirector software is operating. In the preferred embodiment of the present invention, the host system is a user's desktop PC, although, alternatively, the host system could be a network server connected to the user's PC via a local-area network ("LAN"), or could be any other system that is in communication with the user's desktop PC.

A redirector program operating at the host system enables the user to redirect or mirror certain user-selected data items (or parts of data items) from the host system to the user's mobile data communication device upon detecting that one or more user-defined triggering events has occurred. (In this application the terms "information," "data items," "messages," and "datagrams" are used interchangeably to mean an information object that is received at the host system and redirected to the mobile device.) Also operating at the host system are various sub-systems that can be configured to create triggering events, such as a screen saver sub-system or a keyboard sub-system, as well as sub-systems for repackaging the user's data items for transparent delivery to the mobile data device, such as a TCP/IP sub-system or one or more E-Mail sub-systems. Other sub-systems for creating triggering events and repackaging the user's data items could also be present at the host system. The host system also includes a primary memory store where the user's data items are normally stored.

Using the redirector program, the user can select certain data items for redirection, such as E-mail messages, calendar events, meeting notifications, address entries, journal entries, personal reminders etc. Having selected the data items for redirection, the user can then configure one or more event triggers to be sensed by the redirector program to initiate redirection of the user data items. These user-defined trigger points (or event triggers) include external events, internal events and networked events. Examples of external events include: receiving a message from the user's mobile data communication device to begin redirection; receiving a similar message from some external computer; sensing that the user is no longer in the vicinity of the host system; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the examples of the types of user-defined events that can trigger the redirector program to push data items from the host to the mobile device. Although in the preferred embodiment it is anticipated that the configuration that specifies which data items will be redirected and in what form will be set at the host system, it is within the scope of this invention that such configuration may be set or modified through data sent from the mobile communications device.

In addition to the functionality noted above, the redirector program provides a set of software-implemented control functions for determining the type of mobile data communication device and its address, for programming a preferred list of message types that are to be redirected, and for determining whether the mobile device can receive and process certain types of message attachments, such as word processor or voice attachments. The determination of whether a particular mobile device can receive and process attachments is preferably initially configured by the user of that mobile device at the host system. This configuration can be altered on a global, per message basis or per device basis by transmitting a command message from the mobile device to the host system. If the redirector is configured so that the mobile data device cannot receive and process word processor or voice attachments, then the redirector routes these attachments to an external machine that is compatible with the particular attachment, such as an attached printer or networked fax machine or telephone. Other types of attachments could be redirected to other types of external machines in a similar fashion, depending upon the capabilities of the mobile device. For example, if a user is traveling and receives a message with an attachment that the user's mobile device can process or display, the user may from a mobile communications device send a command message to the host system indicating that that attachment is to be sent to a fax machine at a hotel where the user will be spending the evening. This enables the user to receive important E-mail attachments as long as the host system is provided with sufficient information about the destination where the attachment is to be forwarded.

Once an event has triggered redirection of the user data items, the host system then repackages these items in a manner that is transparent to the mobile data communication device, so that information on the mobile device appears similar to information on the user's host system. The preferred repackaging method includes wrapping the user data items in an E-mail envelope that corresponds to the address of the mobile data communication device, although, alternatively, other repackaging methods could be used with the present invention, such as special-purpose TCP/IP wrapping techniques, or other methods of wrapping the user selected data items. The repackaging preferably results in E-mail messages generated by the user from the mobile device to be transmitted from the host system, thus enabling the user to appear to have a single E-mail address, such that the recipients of messages sent from the mobile communications device do not know where the user was physically located when the message was first sent. The repackaging also permits both messages to the mobile device and sent from the mobile device to be encrypted and decrypted as well as compressed and decompressed.

In an alternative system and method, the redirector program executes on a network server, and the server is programmed to detect numerous redirection event triggers over the network from multiple user desktop computers coupled to the server via a LAN. The server can receive internal event triggers from each of the user desktops via the network, and can also receive external event triggers, such as messages from the users' mobile data communication devices. In response to receiving one of these triggers, the server redirects the user's data items to the proper mobile data communication device. The user data items and addressing information for a particular mobile device can be stored at the server or at the user's PC. Using this alternative configuration, one redirector program can serve a plurality of users. This alternative configuration could also include an internet- or intranet-based redirector program that could be accessible through a secure webpage or other user interface. The redirector program could be located on an Internet Service Provider's system and accessible only through the Internet.

In another alternative configuration of the present invention, a redirector program operates at both the host system and at the user's mobile data communication device. In this configuration, the user's mobile device operates similarly to the host system described below, and is configured in a similar fashion to push certain user-selected data items from the mobile device to the user's host system (or some other computer) upon detecting an event trigger at the mobile device. This configuration provides two-way pushing of information from the host to the mobile device and from the mobile device to the host.

The primary advantage of the present invention is that it provides a system and method for triggering the continuous and real-time redirection of user-selected data items from a host system to a mobile data communication device. Other advantages of the present invention include: (1) flexibility in defining the types of user data to redirect, and in defining a preferred list of message types that are to be redirected or preferred senders whose messages are to be redirected; (2) flexibility in configuring the system to respond to numerous internal, external and networked triggering events; (3) transparent repackaging of the user data items in a variety of ways such that the mobile data communication device appears as though it were the host system; (4) integration with other host system components such as E-mail, TCP/IP, keyboard, screen saver, webpages and certain programs that can either create user data items or be configured to provide trigger points; (5) the ability to operate locally on a user's desktop system or at a distance via a network server; (6) the ability to receive, process, and manage attachment redirection; and (7) dynamically change and dynamically re-route attachment redirection.

These are just a few of the many advantages of the present invention, as described in more detail below. As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein.

DETAILED DESCRIPTION OF THE DRAWINGS

Figure 1:
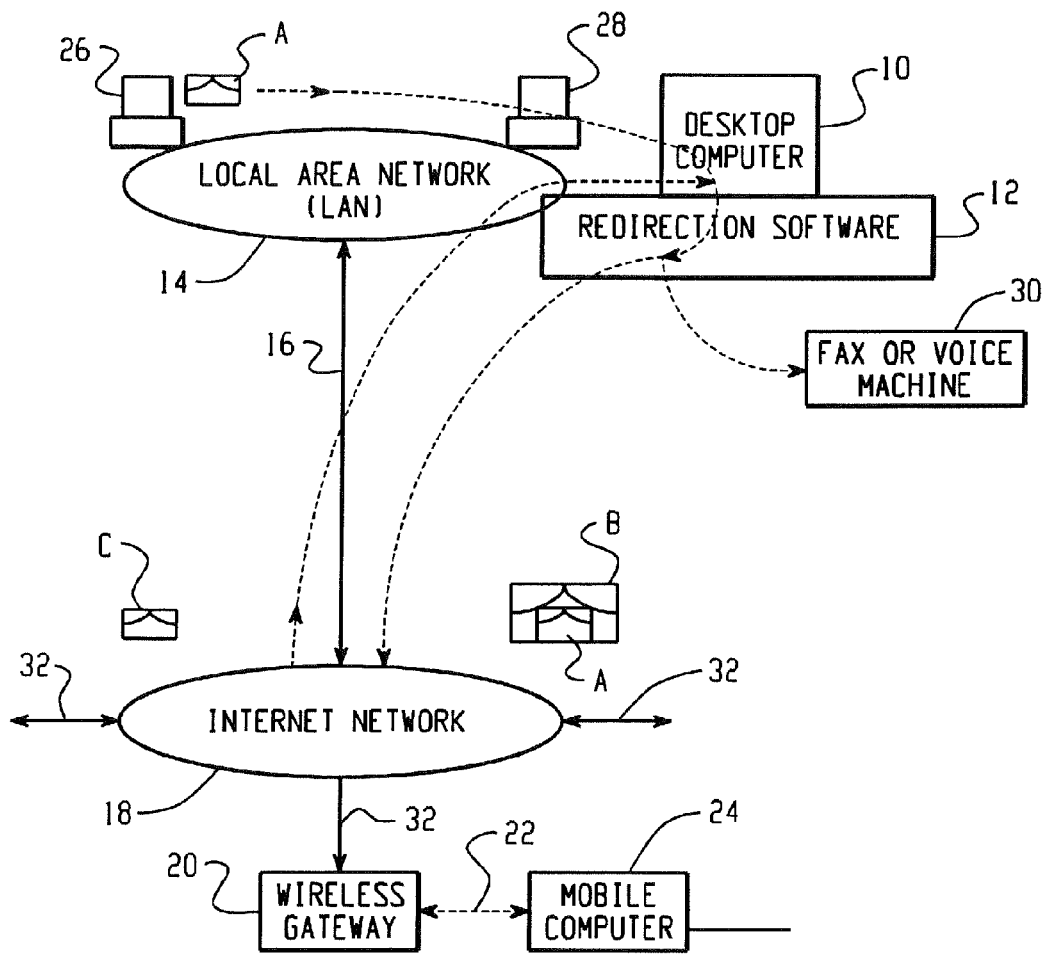
FIG. 1 is a system diagram showing the redirection of user data items from a user's desktop PC (host system) to the user's mobile data communication device, where the redirector software is operating at the user's desktop PC.

Referring now to the drawings, FIG. 1 is an example system diagram showing the redirection of user data items (such as message A or C) from a user's office PC (host system) 10 to the user's mobile data communication device 24, where the redirector software (program) 12 is operating at the user's PC. Message A in FIG. 1 represents an internal message sent from desktop 26 to the user's host system 10 via LAN 14. Message C in FIG. 1 represents an external message from a sender that is not directly connected to LAN 14, such as the user's mobile data communication device 24, some other user's mobile device (not shown), or any user connected to the Internet 18. Message C also represents a command message from the user's mobile data communication device 24 to the host system 10. As described in more detail in FIG. 3, the host system 10 preferably includes, along with the typical hardware and software associated with a workstation or desktop computer, the redirector program 12, a TCP/IP subsystem 42, a primary message store 40, an E-mail subsystem 44, a screen saver subsystem 48, and a keyboard subsystem 46.

In FIG. 1, the host system 10 is the user's desktop system, typically located in the user's office. The host system 10 is connected to a LAN 14, which also connects to other computers 26, 28 that may be in the user's office or elsewhere. The LAN 14, in turn, is connected to a wide area network ("WAN") 18, preferably the Internet, which is defined by the use of the Transmission Control Protocol/Internet Protocol ("TCP/IP") to exchange information, but which, alternatively could be any other type of WAN. The connection of the LAN 14 to the WAN 18 is via high bandwidth link 16, typically a T1 or T3 connection. The WAN 18 in turn is connected to a variety of gateways 20, via connections 32. A gateway forms a connection or bridge between the WAN 18 and some other type of network, such as an RF wireless network, cellular network, satellite network, or other synchronous or asynchronous land-line connection.

In the example of FIG. 1, a wireless gateway 20 is connected to the Internet for communicating via wireless link 22 to a plurality of wireless mobile data communication devices 24. Also shown in FIG. 1 is machine 30, which could be a FAX machine, a printer, a system for displaying images (such as video), a cellular phone, or a machine capable of processing and playing audio files, such as a voice mail system. Machine 30 is also referred to herein as an attachment displayer. The present invention includes the ability to redirect certain message attachments to such an external machine 30 if the redirector program configuration data reflects that the mobile device 24 cannot receive and process the attachments, or if the user has specified that certain attachments are not to be forwarded to mobile device 24, even if such device can process those attachments.

For example, consider an E-mail sent to a user that includes three attachments—a word processing document, a video clip and an audio clip. The redirection program could be configured to send the text of the E-mail to the remote device, to send the word processing document to a networked printer located near the user, to send the video clip to a store accessible through a secure connection through the internet and to send the audio clip to the user's voice mail system. This example is not intended to limit the breadth and scope of the invention, but rather to illustrate the variety of possibilities embodied in the redirection concept. The attachment redirection capabilities of the present invention are further described below with reference to FIGS. 6-8.

Figure 4:
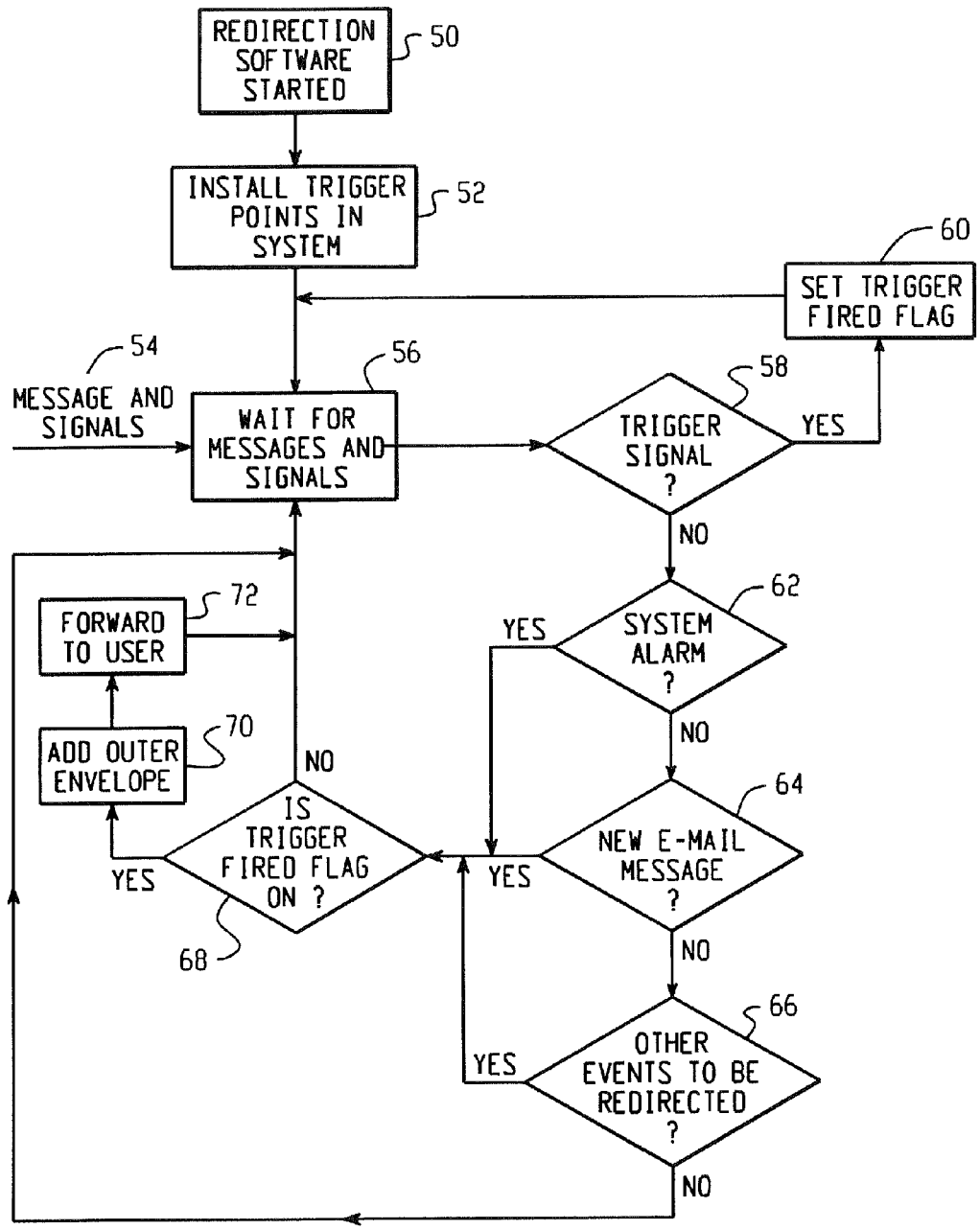
FIG. 4 is a flow chart showing the steps carried out by the redirector software operating at the host system.

The preferred mobile data communication device 24 is a hand-held two-way wireless paging computer, a wirelessly enabled palm-top computer, a mobile telephone with data messaging capabilities, or a wirelessly enabled laptop computer, but could, alternatively be other types of mobile data communication devices capable of sending and receiving messages via a network connection 22. Although it is preferable for the system to operate in a two-way communications mode, certain aspects of the invention could be beneficially used in a "one and one-half" or acknowledgment paging environment, or even with a one-way paging system. The mobile data communication device 24 includes software program instructions that work in conjunction with the redirector program 12 to enable the seamless, transparent redirection of user-selected data items. FIG. 4 describes the basic method steps of the redirector program 12, and FIG. 5 describes the steps of the corresponding program operating at the mobile device 24.

In an alternative embodiment of the present invention, not explicitly shown in the drawings, the mobile device 24 also includes a redirector program. In this embodiment, user selected data items can be replicated from the host to the mobile device and vice versa. The configuration and operation of the mobile device 24 having a redirector program is similar to that described herein with respect to FIGS. 1-8.

A user of the present invention can configure the redirector program 12 to push certain user-selected data items to the user's mobile data communication device 24 when the redirector 12 detects that a particular user-defined event trigger (or trigger point) has taken place. When a secondary user-defined event trigger (or trigger point) occurs, which could be the same as the initial event trigger or could be a different event, the system may subsequently stop redirection. User-selected data items preferably include E-mail messages, calendar events, meeting notifications, address entries, journal entries, personal alerts, alarms, warnings, stock quotes, news bulletins, etc., but could, alternatively, include any other type of message that is transmitted to the host system 10, or that the host system 10 acquires through the use of intelligent agents, such as data that is received after the host system 10 initiates a search of a database or a website or a bulletin board. In some instances, only a portion of the data item is transmitted to the mobile device 24 in order to minimize the amount of data transmitted via the wireless network 22. In these instances, the mobile device 24 can optionally send a command message to the host system to receive more or all of the data item if the user desires to receive it.

User-defined event triggers that can be detected by the redirector program 12 in the preferred embodiment include external events, internal events and networked events. External events preferably include: (1) receiving a command message (such as message C) from the user's mobile data communication device to begin redirection, or to execute some other command at the host, such as a command to enable the preferred list mode, or to add or subtract a particular sender from the preferred list; (2) receiving a similar message from some external computer; and (3) sensing that the user is no longer in the vicinity of the host system; although, alternatively, an external event can be any other detectable occurrence that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the events that could be used with the present invention to initiate replication of the user-selected data items from the host system 10 to the mobile device 24.

FIG. 1 shows an E-mail message A being communicated over LAN 14 from computer 26 to the user's desktop system 10 (also shown in FIG. 1 is an external message C, which could be an E-mail message from an Internet user, or could be a command message from the user's mobile device 24). Once the message A (or C) reaches the primary message store of the host system 10, it can be detected and acted upon by the redirection software 12. The redirection software 12 can use many methods of detecting new messages. The preferred method of detecting new messages is using Microsoft's® Messaging API (MAPI), in which programs, such as the redirector program 12, register for notifications or 'advise syncs' when changes to a mailbox take place. Other methods of detecting new messages could also be used with the present invention.

Assuming that the redirector program 12 is activated, and has been configured by the user (either through the sensing of an internal, network or external event) to replicate certain user data items (including messages of type A or C) to the mobile device 24, when the message A is received at the host system 10, the redirector program 12 detects its presence and prepares the message for redirection to the mobile device 24. In preparing the message for redirection, the redirector program 12 could compress the original message A, could compress the message header, or could encrypt the entire message A to create a secure link to the mobile device 24.

Also programmed into the redirector 12 is the address of the user's mobile data communication device 24, the type of device, and whether the device 24 can accept certain types of attachments, such as word processing or voice attachments. If the user's type of mobile device cannot accept these types of attachments, then the redirector 12 can be programmed to route the attachments to a fax or voice number where the user is located using an attached fax or voice machine 30 or other type of attachment displayer.

The redirector may also be programmed with a preferred list mode that is configured by the user either at the host system 10, or remotely from the user's mobile data communication device by transmitting a command message C. The preferred list contains a list of senders (other users) whose messages are to be redirected or a list of message characteristics that determine whether a message is to be redirected. If activated, the preferred list mode causes the redirector program 12 to operate like a filter, only redirecting certain user data items based on whether the data item was sent from a sender on the preferred list or has certain message characteristics that if present will trigger or suppress redirection of the message. In the example of FIG. 1, if desktop system 26 was operated by a user on the preferred list of host system 10, and the preferred list option was activated, then message A would be redirected. If, however, desktop 26 was operated by a user not on the host system's preferred list, then message A would not be redirected, even if the user of the host system had configured the redirector to push messages of type A. The user of the host system 10 can configure the preferred list directly from the desktop system, or, alternatively, the user can then send a command message (such as C) from the mobile device 24 to the desktop system 10 to activate the preferred list mode, or to add or delete certain senders or message characteristics from the preferred list that was previously configured. It should be appreciated that a redirection program could combine message characteristics and preferred sender lists to result in a more finely-tuned filter. Messages marked as low priority or that are simple return receipts or message read receipts, for example, could always be suppressed from redirection while messages from a particular sender would always be redirected.

After the redirector has determined that a particular message should be redirected, and it has prepared the message for redirection, the redirector software 12 then sends the message A to a secondary memory store located in the mobile device 24, using whatever means are necessary. In the preferred embodiment this method is to send the message A back over the LAN 14, WAN 18, and through the wireless gateway 20 to the mobile data communication device 24. In doing so, the redirector preferably repackages message A as an E-mail with an outer envelope B that contains the addressing information of the mobile device 24, although alternative repackaging techniques and protocols could be used, such as a TCP/IP repackaging and delivery method (most commonly used in the alternative server configuration shown in FIG. 2). The wireless gateway 20 requires this outer envelope information B in order to know where to send the redirected message A. Once the message (A in B) is received by the mobile device 24, the outer envelope B is removed and the original message A is placed in the secondary memory store within the mobile device 24. By repackaging and removing the outer envelope in this manner, the present invention causes the mobile computer 24 to appear to be at the same physical location as the host system 10, thus creating a transparent system.

In the case where message C is representative of an external message from a computer on the Internet 18 to the host system 10, and the host 10 has been configured to redirect messages of type C, then in a similar manner to message A, message C would be repackaged with an outer envelope B and transmitted to the user's mobile device 24. In the case where message C is representative of a command message from the user's mobile device 24 to the host system 10, the command message C is not redirected, but is acted upon by the host system 10.

If the redirected user data item is an E-mail message, as described above, the user at the mobile device 24 sees the original subject, sender's address, destination address, carbon copy and blind carbon copy. When the user replies to this message, or when the user authors a new message, the software operating at the mobile device 24 adds a similar outer envelope to the reply message (or the new message) to cause the message to be routed first to the user's host system 10, which then removes the outer envelope and redirects the message to the final destination, such as back to computer 26. In the preferred embodiment, this results in the outgoing redirected message from the user's host system 10 being sent using the E-mail address of the host mailbox, rather than the address of the mobile device, so that it appears to the recipient of the message that the message originated from the user's desktop system 10 rather than the mobile data communication device. Any replies to the redirected message will then be sent to the desktop system 10, which if it is still in redirector mode, will repackage the reply and re-send it to the user's mobile data device, as described above.

Figure 2:
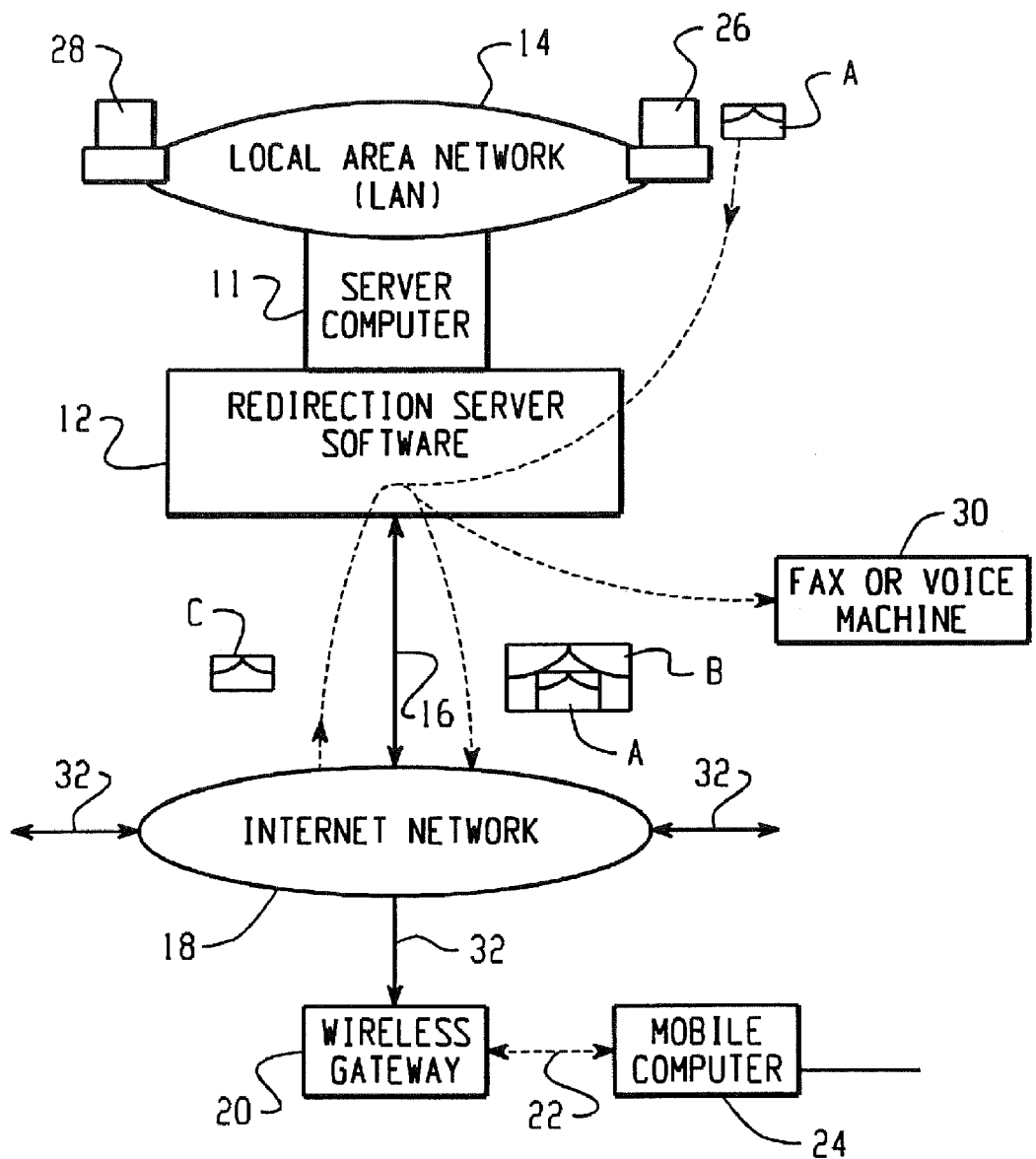
FIG. 2 is a system diagram showing the redirection of user data items from a network server (host system) to the user's mobile data communication device, where the redirector software is operating at the server.

FIG. 2 is an alternative system diagram showing the redirection of user data items from a network server 11 to the user's mobile data communication device 24, where the redirector software 12 is operating at the server 11. This configuration is particularly advantageous for use with message servers such as Microsoft's® Exchange Server, which is normally operated so that all user messages are kept in one central location or mailbox store on the server instead of in a store within each user's desktop PC. This configuration has the additional advantage of allowing a single system administrator to configure and keep track of all users having messages redirected. If the system includes encryption keys, these too can be kept at one place for management and update purposes.

In this alternative configuration, server 11 preferably maintains a user profile for each user's desktop system 10, 26, 28, including information such as whether a particular user can have data items redirected, which types of message and information to redirect, how to process various types of message attachments, what events will trigger redirection, the address of the users' mobile data communication device 24, the type of mobile device, and the user's preferred list, if any. The event triggers are preferably detected at the user's desktop system 10, 26, 28 and can be any of the external, internal or network events listed above. The desktop systems 10, 26, 28 preferably detect these events and then transmit a message to the server computer 11 via LAN 14 to initiate redirection, or to subsequent halt redirection. Although the user data items are preferably stored at the server computer 11 in this embodiment, they could, alternatively, be stored at each user's desktop system 10, 26, 28, which would then transmit them to the server computer 11 after an event has triggered redirection.

As shown in FIG. 2, desktop system 26 generates a message A that is transmitted to and stored at the host system 11, which is the network server operating the redirector program 12. The message A is for desktop system 10, but in this embodiment, user messages are stored at the network server 11. When an event occurs at desktop system 10, an event trigger is generated and transmitted to the network server 11, which then determines who the trigger is from, whether that desktop has redirection capabilities, and if so, the server (operating the redirector program) uses the stored configuration information to redirect message A to the mobile computer 24 associated with the user of desktop system 10.

As described above with reference to FIG. 1, message C could be either a command message from a user's mobile data communication device 24, or it could be a message from an external computer, such as a computer connected to the Internet 18. If the message C is from an Internet computer to the user's desktop system 10, and the user has redirection capabilities, then the server 11 detects the message C, repackages it using electronic envelope B, and redirects the repackaged message (C in B) to the user's mobile device 24. If the message C is a command message from the user's mobile device 24, then the server 11 simply acts upon the command message.

Figure 3:
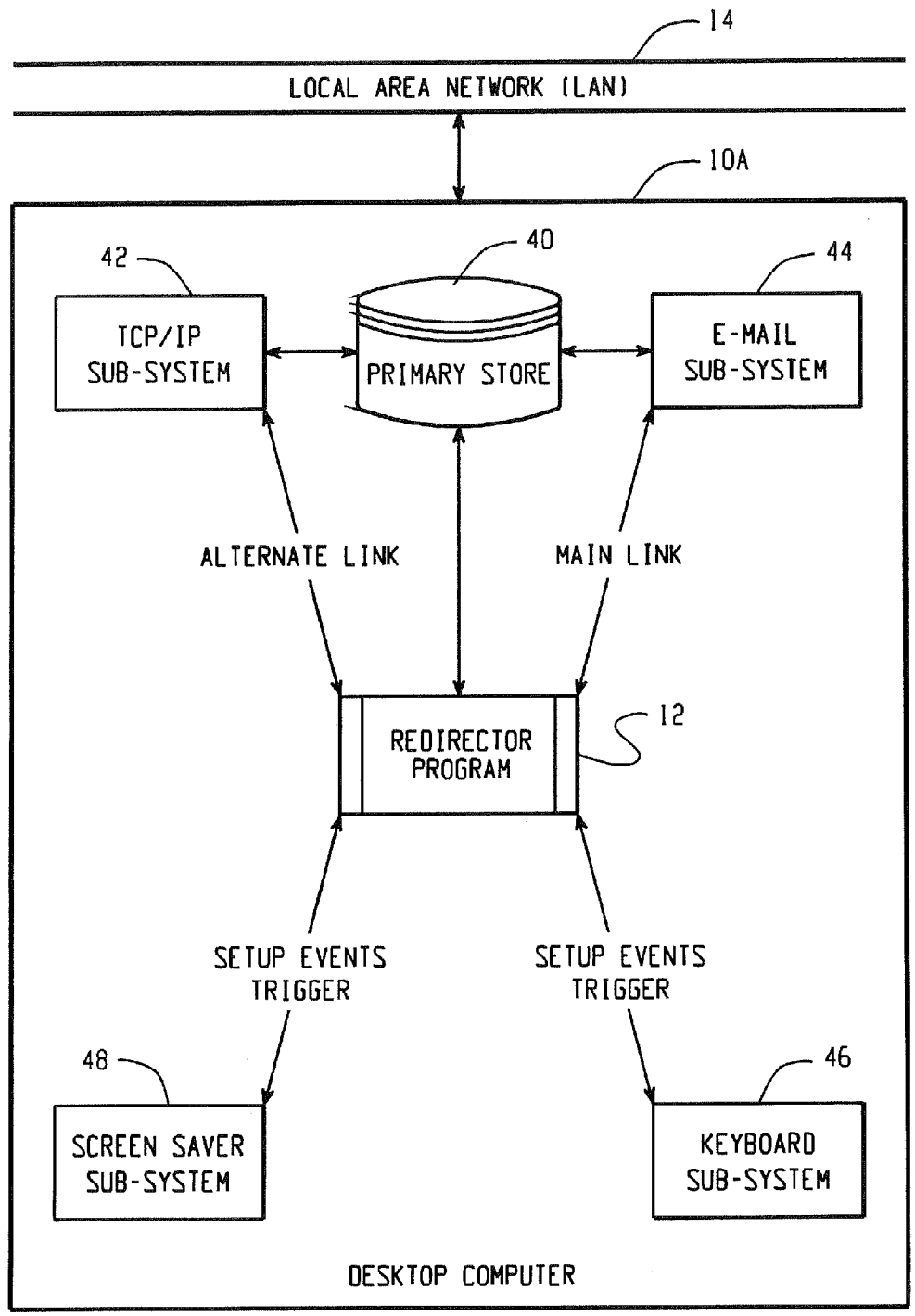
FIG. 3 is a block diagram showing the interaction of the redirector software with other components of the host system in FIG. 1 (the user's desktop PC) to enable the pushing of information from the host system to the user's mobile data communication device.

Turning now to FIG. 3, a block diagram showing the interaction of the redirector software 12 with additional components of the host system 10 of FIG. 1 (the desktop PC) to enable more fully the pushing of information from the host system 10 to the user's mobile data communication device 24 is set forth. These additional components are illustrative of the type of event-generating systems that can be configured and used with the redirector software 12, and of the type of repackaging systems that can be used to interface with the mobile communication device 24 to make it appear transparent to the user.

The desktop system 10 is connected to LAN 14, and can send and receive data, messages, signals, event triggers, etc., to and from other systems connected to the LAN 14 and to external networks 18, 22, such as the Internet or a wireless data network, which are also coupled to the LAN 14. In addition to the standard hardware, operating system, and application programs associated with a typical microcomputer or workstation, the desktop system 10 includes the redirector program 12, a TCP/IP sub-system 42, an E-mail sub-system 44, a primary data storage device 40, a screen saver sub-system 48, and a keyboard sub-system 46. The TCP/IP and E-mail subsystems 42, 44 are examples of repackaging systems that can be used to achieve the transparency of the present invention, and the screen saver and keyboard sub-systems 46, 48 are examples of event generating systems that can be configured to generate event messages or signals that trigger redirection of the user selected data items.

The method steps carried out by the redirector program 12 are described in more detail in FIG. 4. The basic functions of this program are: (1) configure and setup the user-defined event trigger points that will start redirection; (2) configure the types of user data items for redirection and optionally configure a preferred list of senders whose messages are to be redirected; (3) configure the type and capabilities of the user's mobile data communication device, including the configuration of attachment handling and type recognition; (4) receive messages and signals from the repackaging systems and the event generating systems; and (5) command and control the redirection of the user-selected data items to the mobile data communication device via the repackaging systems. Other functions not specifically enumerated could also be integrated into this program.

The E-Mail sub-system 44 is the preferred link to repackaging the user-selected data items for transmission to the mobile data communication device 24, and preferably uses industry standard mail protocols, such as SMTP, POP, IMAP, MIME and RFC-822, to name but a few. The E-Mail sub-system 44 can receive messages A from external computers on the LAN 14, or can receive messages C from some external network such as the Internet 18 or a wireless data communication network 22, and stores these messages in the primary data store 40. Assuming that the redirector 12 has been triggered to redirect messages of this type, the redirector detects the presence of any new messages and instructs the E-Mail system 44 to repackage the message by placing an outer wrapper B about the original message A (or C), and by providing the addressing information of the mobile data communication device 24 on the outer wrapper B. As noted above, this outer wrapper B is removed by the mobile device 24, and the original message A (or C) is then recovered, thus making the mobile device 24 appear to be the desktop system 10.

In addition, the E-Mail sub-system 44 receives messages back from the mobile device 24 having an outer wrapper with the addressing information of the desktop system 10, and strips this information away so that the message can be routed to the proper sender of the original message A (or C). The E-Mail sub-system also receives command messages C from the mobile device 24 that are directed to the desktop system 10 to trigger redirection or to carry out some other function. The functionality of the E-Mail sub-system 44 is controlled by the redirector program 12.

The TCP/IP sub-system 42 is an alternative repackaging system. It includes all of the functionality of the E-Mail sub-system 44, but instead of repackaging the user-selected data items as standard E-mail messages, this system repackages the data items using special-purpose TCP/IP packaging techniques. This type of special-purpose sub-system is useful in situations where security and improved speed are important to the user. The provision of a special-purpose wrapper that can only be removed by special software on the mobile device 24 provides the added security, and the bypassing of E-mail store and forward systems can improve speed and real-time delivery.

As described previously, the present invention can be triggered to begin (or end) redirection upon detecting numerous external, internal and networked events, or trigger points. Examples of external events include: receiving a command message from the user's mobile data communication device 24 to begin redirection; receiving a similar message from some external computer; sensing that the user is no longer in the vicinity of the host system, such as by using the output of a digital camera, or by sensing the proximity of the user's mobile device using a wireless connection; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer (not the mobile device) that is connected to the host system via a network to initiate redirection.

The screen saver and keyboard sub-systems 46, 48 are examples of systems that are capable of generating internal events. Functionally, the redirector program 12 provides the user with the ability to configure the screen saver and keyboard systems so that under certain conditions an event trigger will be generated that can be detected by the redirector 12 to start (or stop) the redirection process. For example, the screen saver system can be configured so that when the screen saver is activated, after, for example, 10 minutes of inactivity on the desktop system, an event trigger is transmitted to the redirector 12, which starts redirecting the previously selected user data items. When the screen saver becomes activated, for whatever reason, a second event trigger is generated in order to halt redirection. In a similar manner the keyboard sub-system can be configured to generate event triggers when no key has been depressed for a particular period of time, thus indicating that redirection should commence, and then to subsequently generate another trigger when a key is depressed to stop redirection. These are just two examples of the numerous application programs and hardware systems internal to the host system 10 that can be used to generate internal event triggers.

Figure 5:
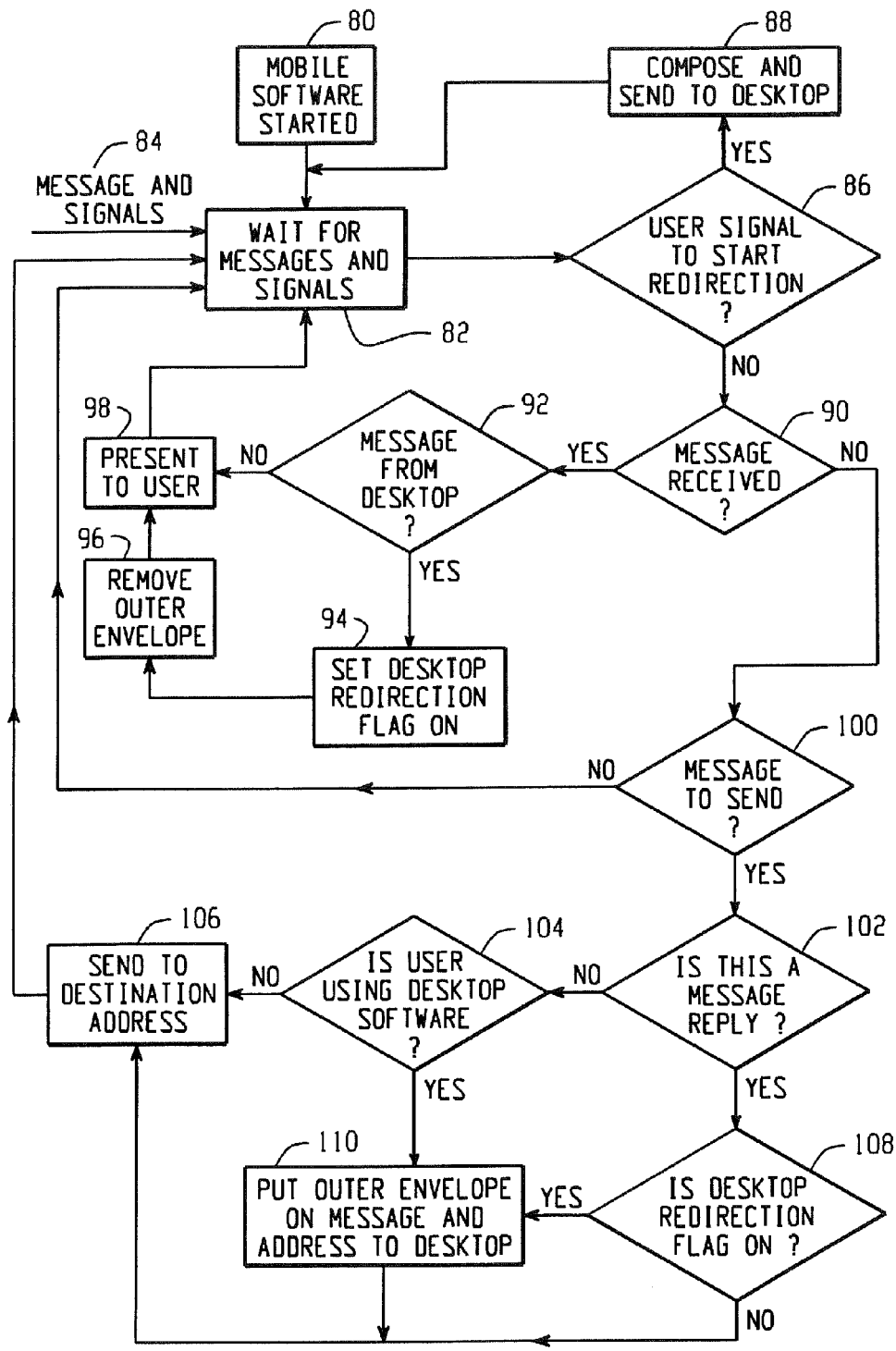
FIG. 5 is a flow chart showing the steps carried out by the mobile data communication device to interface with the redirector software operating at the host system.

FIGS. 4 and 5, set forth, respectively, flow charts showing the steps carried out by the redirector software 12 operating at the host system 10, and the steps carried out by the mobile data communication device 24 in order to interface with the host system. Turning first to FIG. 4, at step 50, the redirector program 12 is started and initially configured. The initial configuration of the redirector 12 includes: (1) defining the event triggers that the user has determined will trigger redirection; (2) selecting the user data items for redirection; (3) selecting the repackaging sub-system, either standard E-Mail, or special-purpose technique; (4) selecting the type of data communication device, indicating whether and what type of attachments the device is capable of receiving and processing, and inputting the address of the mobile device; and (5) configuring the preferred list of user selected senders whose messages are to be redirected.

FIG. 4 sets forth the basic steps of the redirector program 12 assuming it is operating at a desktop system 10, such as shown in FIG. 1. If the redirector 12 is operating at a network server 11, as shown in FIG. 2, then additional configuration steps may be necessary to enable redirection for a particular desktop system 10, 26, 28 connected to the server, including: (1) setting up a profile for the desktop system indicating its address, events that will trigger redirection, and the data items that are to be redirected upon detecting an event; (2) maintaining a storage area at the server for the data items; and (3) storing the type of data communication device to which the desktop system's data items are to be redirected, whether and what type of attachments the device is capable of receiving and processing, and the address of the mobile device.

Once the redirector program is configured 50, the trigger points (or event triggers) are enabled at step 52. The program 12 then waits 56 for messages and signals 54 to begin the redirection process. A message could be an E-Mail message or some other user data item than may have been selected for redirection, and a signal could be a trigger signal, or could be some other type of signal that has not been configured as an event trigger. When a message or signal is detected, the program determines 58 whether it is one of the trigger events that has been configured by the user to signal redirection. If so, then at step 60 a trigger flag is set, indicating that subsequently received user data items (in the form of messages) that have been selected for redirection should be pushed to the user's mobile data communication device 24.

If the message or signal 54 is not a trigger event, the program then determines at steps 62, 68 and 66 whether the message is, respectively, a system alarm 62, an E-Mail message 64, or some other type of information that has been selected for redirection. If the message or signal is none of these three items, then control returns to step 56, where the redirector waits for additional messages 54 to act upon. If, however the message is one of these three types of information, then the program 12 determines, at step 68, whether the trigger flag has been set, indicating that the user wants these items redirected to the mobile device. If the trigger flag is set, then at step 70, the redirector 12 causes the repackaging system (E-Mail or TCP/IP) to add the outer envelope to the user data item, and at step 72 the repackaged data item is then redirected to the user's mobile data communication device 24 via LAN 14, WAN 18, wireless gateway 20 and wireless network 22. Control then returns to step 56 where the program waits for additional messages and signals to act upon. Although not shown explicitly in FIG. 4, after step 68, the program could, if operating in the preferred list mode, determine whether the sender of a particular data item is on the preferred list, and if not, then the program would skip over steps 70 and 72 and proceed directly back to step 56. If the sender was on the preferred list, then control would similarly pass to steps 70 and 72 for repackaging and transmission of the message from the preferred list sender.

FIG. 5 sets forth the method steps carried out by the user's mobile data communication device 24 in order to interface to the redirector program 12 of the present invention. At step 80 the mobile software is started and the mobile device 24 is configured to operate with the system of the present invention, including, for example, storing the address of the user's desktop system 10.

At step 82, the mobile device waits for messages and signals 84 to be generated or received. Assuming that the redirector software 12 operating at the user's desktop system 10 is configured to redirect upon receiving a message from the user's mobile device 24, at step 86 the user can decide to generate a command message that will start redirection. If the user does so, then at step 88 the redirection message is composed and sent to the desktop system 10 via the wireless network 22, through the wireless gateway 20, via the Internet 18 to the LAN 14, and is finally routed to the desktop machine 10. In this situation where the mobile device 24 is sending a message directly to the desktop system 10, no outer wrapper is added to the message (such as message C in FIGS. 1 and 2). In addition to the redirection signal, the mobile device 24 could transmit any number of other commands to control the operation of the host system, and in particular the redirector program 12.

For example, the mobile 24 could transmit a command to put the host system into the preferred list mode, and then could transmit additional commands to add or subtract certain senders from the preferred list. In this manner, the mobile device 24 can dynamically limit the amount of information being redirected to it by minimizing the number of senders on the preferred list. Other example commands include: (1) a message to change the configuration of the host system to enable the mobile device 24 to receive and process certain attachments; and (2) a message to instruct the host system to redirect an entire data item to the mobile device in the situation where only a portion of a particular data item has been redirected.

Turning back to FIG. 5, if the user signal or message is not a direct message to the desktop system 10 to begin redirection (or some other command), then control is passed to step 90, which determines if a message has been received. If a message is received by the mobile, and it is a message from the user's desktop 10, as determined at step 92, then at step 94 a desktop redirection flag is set "on" for this message, and control passes to step 96 where the outer envelope is removed. Following step 96, or in the situation where the message is not from the user's desktop, as determined at step 92, control passes to step 98, which displays the message for the user on the mobile device's display. The mobile unit 24 then returns to step 82 and waits for additional messages or signals.

If the mobile device 24 determines that a message has not been received at step 90, then control passes to step 100, where the mobile determines whether there is a message to send. If not, then the mobile unit returns to step 82 and waits for additional messages or signals. If there is at least one message to send, then at step 102 the mobile determines whether it is a reply message to a message that was received by the mobile unit. If the message to send is a reply message, then at step 108, the mobile determines whether the desktop redirection flag is on for this message. If the redirection flag is not on, then at step 106 the reply message is simply transmitted from the mobile device to the destination address via the wireless network 22. If, however, the redirection flag is on, then at step 110 the reply message is repackaged with the outer envelope having the addressing information of the user's desktop system 10, and the repackaged message is then transmitted to the desktop system 10 at step 106. As described above, the redirector program 12 executing at the desktop system then strips the outer envelope and routes the reply message to the appropriate destination address using the address of the desktop system as the "from" field, so that to the recipient of the redirected message, it appears as though it originated from the user's desktop system rather than the mobile data communication device.

If, at step 102, the mobile determines that the message is not a reply message, but an original message, then control passes to step 104, where the mobile determines if the user is using the redirector software 12 at the desktop system 10, by checking the mobile unit's configuration. If the user is not using the redirector software 12, then the message is simply transmitted to the destination address at step 106. If, however, the mobile determines that the user is using the redirector software 12 at the desktop system 10, then control passes to step 110, where the outer envelope is added to the message. The repackaged original message is then transmitted to the desktop system 10 at step 106, which, as described previously, strips the outer envelope and routes the message to the correct destination. Following transmission of the message at step 106, control of the mobile returns to step 82 and waits for additional messages or signals.

Figure 6:
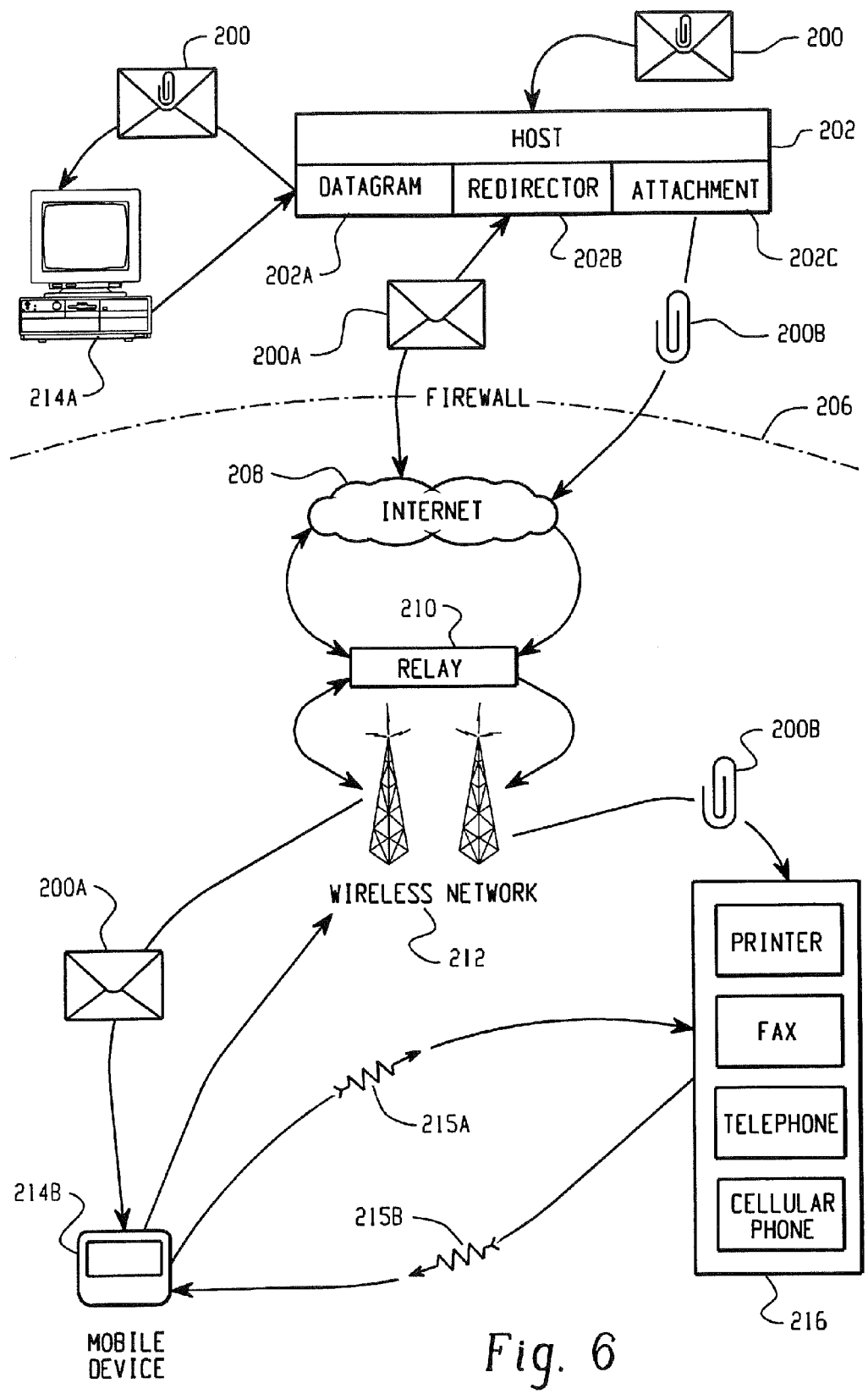
FIG. 6 sets forth a system for redirecting messages having attachments between a host system and a mobile device.

FIG. 6 sets forth a system for redirecting messages having attachments 200, preferably using the redirector program discussed above. This system preferably includes a desktop system 214A, which is associated with a mobile data communication device 214B, a host system 402, a relay system 410, and a plurality of attachment displayers 416. The host system includes a datagram component 202A, a redirector program 202B, and an attachment processing component 202C. The datagram component 202A is used to communicate datagrams 200 (i.e., messages or other types of information) between the host system 202 and the desktop system 214A.

The host system 202 could be similar to the server 11 shown above in FIG. 2, in which case the host 202 and the desktop 214A would be coupled via a LAN. Alternatively, however, the host 202 could be remote from the desktop 214A, and could be coupled to it via a LAN, WAN, the Internet 208, a wireless network (not shown), a cableTV network, a satellite network, or any other type of communication medium. The redirector program 202B is similar to the redirector software described above. The attachment processing component 202C provides the functionality described below with reference to FIGS. 7-8.

The host system 202 is separated from any external networks by a firewall system 206. Firewall systems 206 are known in this field, and provide a security function for protecting an internal corporate network from any external networks. The firewall 206 is, in turn, connected to an external network 208, such as the Internet, which is in turn connected to a relay system 210 and then to the wireless network 212. As noted above, the wireless network 212 could be any type of digital or analog wireless communication network, such as a packet data network, a cellular network, a digital cellular network, a satellite network, a microwave network, etc.

The mobile data communication device 214B is configured to operate on the wireless network 212. In addition, the mobile data communication device 214B is preferably configured to operate on one or more short-range wireless frequencies in order to wirelessly communicate information 215A, 215B between the mobile device 214B and the attachment displayers 216. The mobile device 214B and the attachment displayers 216 could be Bluetooth®-enabled devices for communicating at the short-range frequencies associated with the Bluetooth wireless standard. Other short-range wireless standards could also be utilized. The frequencies at which the short-range communication link operate could be RF, microwave, cellular, optical, or Infrared frequencies. The attachment displayers 216 are used by the mobile device 214B to process the attachment element 200B of the datagram 200, and may be one or more of the following devices: printers, fax machines, telephones, cellular phones, copying machines, video display, or any other type of device capable of processing an attachment.

In the system shown in FIG. 6, a datagram with an attached file 200 is sent to the host system 202. The host system 202 then sends the datagram with the attachment 200 intact to the desktop 204A of the recipient of the datagram 200 via the datagram component 202A. The datagram component 202A recognizes the recipient address in the datagram 200 and subsequently forwards the datagram 200 on to the desktop system 214A. The redirector component 202B of the host system 202B also sends the datagram 200A, stripped of the attachment 200B, through the host firewall 206 to the relay 210 and then on to the mobile device 214B via the Internet 208 and the wireless network 212. In a preferred embodiment, the attachment 200B is not initially redirected by the host system 202 when the datagram 200A is redirected. Alternatively, it is possible that automatic forwarding of attachments is possible; especially if the attachment is in a format that can be handled by the mobile device. The datagram 200A contains the original message and also contains information about the attachment 200B, such as the file name, size, and file type.

In a preferred embodiment, after the datagram 200A (minus the attachment 200B) is received at the mobile device 214B, the mobile device 214B will receive a command either from the host system 202 or from the user of the mobile device to find an attachment displayer 216 within its vicinity to process the attachment 200B. Alternatively, the mobile device 214B or user may automatically attempt to find an attachment displayer when the datagram 200A is received. Preferably through short range wireless communication 215A, 215B, the mobile device 214B will query 215A attachment displayers 216 in the local area of the mobile device 214B to determine whether they can process the attachment 200B. The attachment displayers 216 will then send back 215B to the mobile device 214B information pertaining to their location, electronic address, and the type of attachment files they can handle. The mobile device then processes this information regarding the attachment displayers 216, and sends the host system 202 an attachment displayer choice to use with the attachment 200B. The attachment component 202C of the host system receives the attachment displayer choice from the mobile device 214B, and will then send the attachment 200B to the chosen attachment displayer either through the wireless network 212, directly through the Internet 208, via a LAN connection, via a telephone or cellular connection, or via any other type of connection as specified by the information provided from the chosen attachment displayer 216.

In an alternative embodiment of this system, the attachment component 202C of the host system 202 would contain a database of attachment displayers 216 to which it sends attachments 200B by default depending on the file type. This database would include such information as displayer location, compatibility, and security. In this embodiment of the system, the mobile device does not chose the attachment displayer 216 in real-time, although the user may configure the system in advance to use a particular attachment displayer 216 contained in the database. Alternatively, the host system 202 may prompt the user of the mobile device 214B to select from a list of potential attachment displayers 216, or the host may actively determine the location of the mobile device 214B, and then present a list of potential attachment displayers 216 for selection by the user based upon positioning information of the mobile device in relation to the potential attachment displayers 216.

Figure 7:
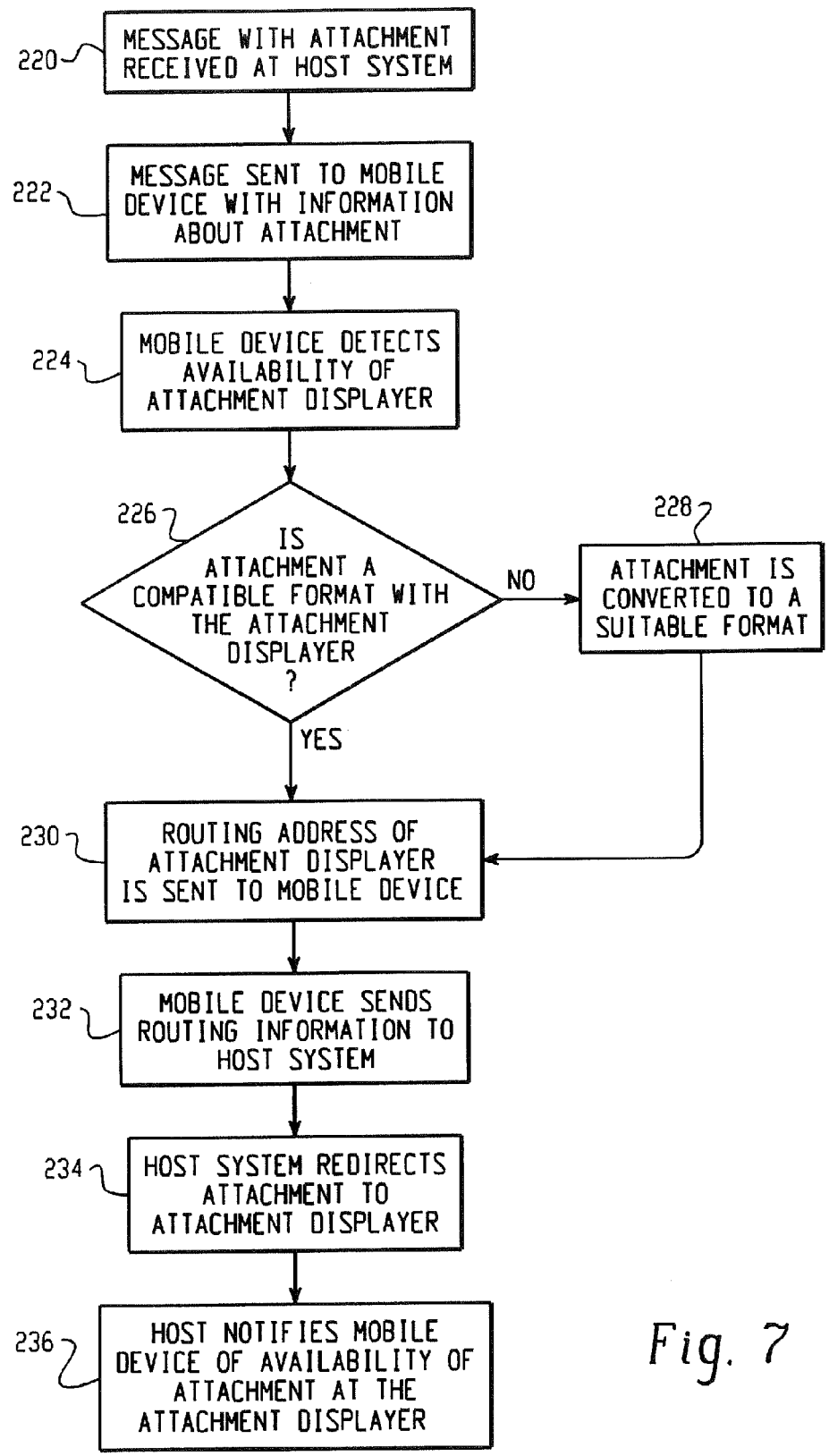
FIG. 7 is a flow diagram setting forth a method of redirecting a message attachment to an attachment displayer that is identified by the mobile device.

FIG. 7 is a flow diagram setting forth a method of redirecting a message attachment to an attachment displayer 216 that is identified by the mobile device 214B. In step 220, the datagram with an attachment 200 is received by the host system 202. The redirector component 202B of the host system 202 sends the datagram 200A to the mobile 214B with information about the attachment in step 222. Note that prior to this step, the attachment 200B is separated from the datagram 200, and is not directly transmitted to the mobile 214B along with the message portion of the datagram 200A. In step 224, the mobile device 214B is instructed to detect the availability of attachment displayers 216 in its local area. This step could be accomplished automatically when the datagram 200A is received, or it could be initiated through a menu selection by the user of the mobile device 214B. Preferably, this step 224 is carried out using a short-range wireless exchange 215A, 215B between the mobile device 214B and nearby attachment displayers 216.

Having obtained this information about the available attachment displayers 216, the mobile device 214B in this step 224 then transmits the availability information to the host system 202. In step 226, the host 202 determines whether the attachment 200B is a compatible format for at least one of the attachment displayers 216 that were discovered in step 224. If a compatible attachment displayer is found, then this device is selected for processing the attachment 200B. If a compatible device is not found, however, then in step 228 the attachment 200B is converted into a suitable format by the host system 202 for one of the discovered attachment displayers 216. In step 230, the attachment displayer 216 selected by the host system 202 then sends the mobile device 214B its electronic routing address. This electronic address can be an IP address, a telephone number, or a machine address. The mobile device 214B then sends the routing address of the attachment displayer 216 back to the host system 202 in step 232. In step 234, the attachment component 202C of the host system 202 uses the routing address to redirect the converted attachment 200B to the selected attachment displayer 216. The host system 202 then notifies the mobile device 214B, in step 236 that the attachment 200B has been redirected to the attachment displayer 216.

Alternatively to the method described in FIG. 7, instead of the host system 202 selecting the appropriate attachment displayer 216, the selection could be made at the mobile device 214B. For example, knowing the type of attachment at the mobile device 214B, which could be provided in the datagram 200A, and having discovered the available attachment displayers 216, the mobile device 214B could then select the appropriate attachment displayer 216, either automatically or based on input from the user of the mobile device 214B. Electronic address information of the selected attachment displayer 216 would then be routed to the host system 202, which would then transmit the attachment 200B directly to the selected attachment displayer 216 by whatever network connection is appropriate.

Figure 8:
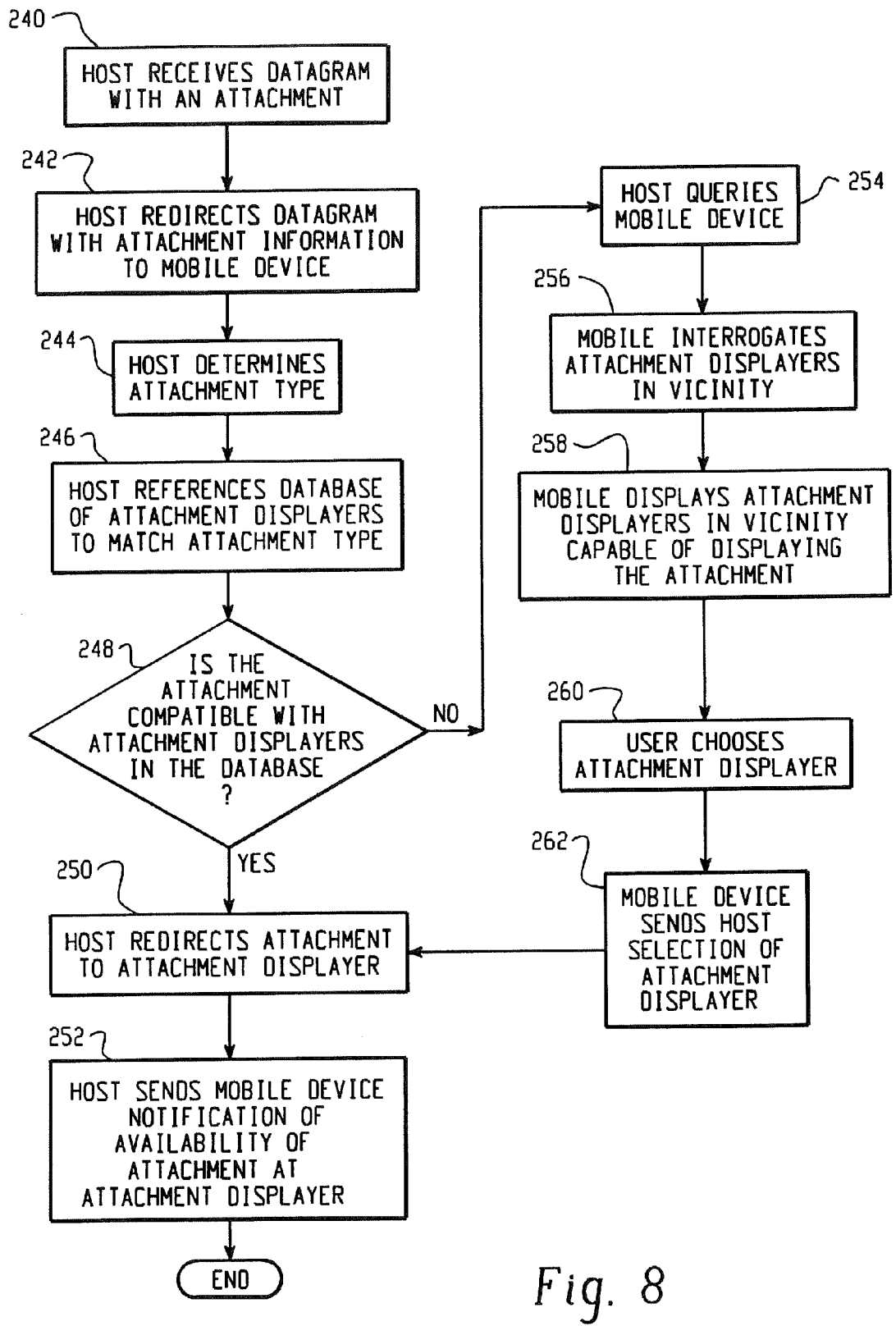
FIG. 8 is a flow diagram setting forth a method of redirecting a message attachment to an attachment displayer that is identified by the host system.
Figure 9:
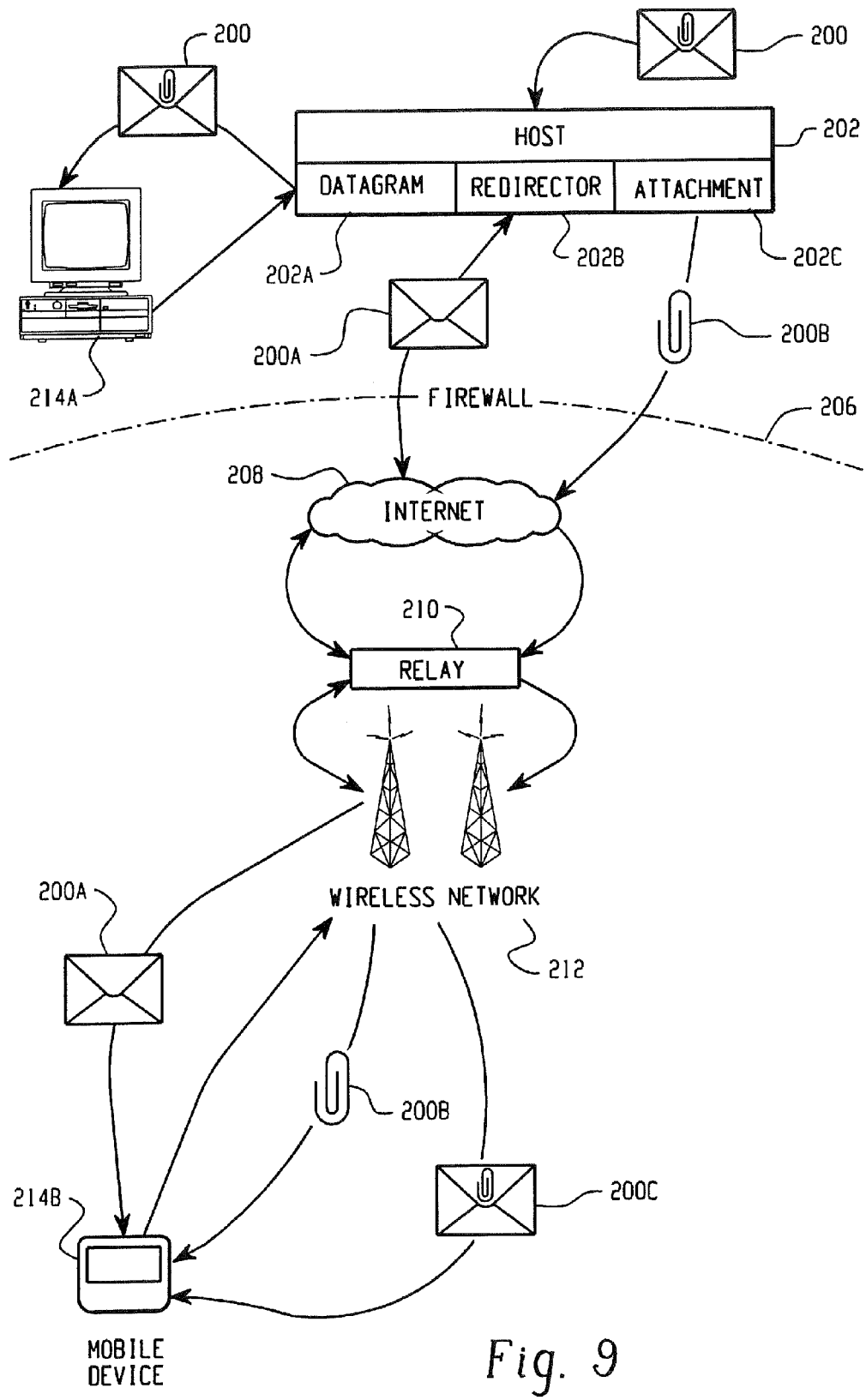
FIG. 9 is alternative system configuration of FIG. 6.

FIG. 8 is a flow diagram setting forth a method of redirecting a message attachment to an attachment displayer 216, where the attachment displayer 26 is identified by the host system 202. In step 240, the host system 202 receives a datagram 200 with an attachment. The redirector component 202B sends the datagram (minus the attachment) 200A to the mobile 214B with information about the attachment in step 242. In step 244, the host system 202 determines the attachment format type. From a database of attachment displayers 216 coupled to the attachment component 202C of the host system 202, the host system 202 will match the attachment format type with a suitable attachment displayer 216 in step 246. In step 250, the host 202 redirects the attachment 200B to the selected attachment displayer 216 based on the information in the attachment component database. In step 252, the host sends a notification to the mobile device 214B when the attachment has been redirected and at which attachment displayer 216 the attachment will be available.

If the attachment is not compatible with any of the attachment displayers 216 in the attachment component database in step 248, then the host 202 may query the mobile device 214B in step 254. In step 256 the mobile device 214B interrogates attachment displayers 216 within the mobile device's vicinity, preferably via a short-range wireless communication exchange 215A, 215B. The mobile device 214B then displays the information that the responsive attachment displayers 216 sent back to the device 214B in step 258. This information can include routing address, compatibility and physical location. The user of the mobile device 214B may then make the selection of the attachment displayer 216 in step 260. In step 262, the mobile device 214B then sends the host system 202 the selection of the attachment displayer 216 including the routing information for the selected device 216.

Alternatively, the host system 202 may make the selection of the appropriate attachment displayer 216 using location information of the mobile device 214B. This location information can be derived based upon communications between the mobile device 214B and the wireless network 212, or it can be based upon a query of the mobile device 214B to transmit its location information to the host system 202, which may be obtainable by a variety of methods, such as an internal GPS receive, a triangulation methodology with a plurality of base stations of the wireless network, etc. In any event, the host system 202 uses the mobile device's location information to select the most appropriate attachment displayer 216 by first selecting the attachment displayers 216 in the database of displayers that are capable of processing the transaction and then by comparing location information of the selected displayers 216 with the location information of the mobile device 214B.

An alternative embodiment to FIG. 6 is illustrated in FIG. 10. FIG. 10 sets forth a system for redirecting messages having attachments 200, preferably using the redirector program discussed above. This system preferably includes an attachment processing component 202C that provides the additional functionality described below. The attachment processing component 202C converts attachments 200B into one or more formats that are acceptable for the mobile device 214B, prior to transmission to the mobile device 214B, such that the mobile device 214B can display the attachment 202B to the user thereby not requiring the use of attachment displayers 216. In this manner, the attachment displayers may be circumvented. However, in this case the wireless network 212 preferably is robust and has a large bandwidth to accommodate large attachment transmissions.

In one embodiment of the attachment processing component 202C, attachments are "trimmed" in that only a portion of the attachment 200B is sent to the mobile device 214B. If the user after viewing the attachment desires to see the rest of the attachment, then the user may send a command to push the remaining portion of the attachment to the mobile device 214B. Alternatively, the user may request the attachment to be sent to an attachment displayer 216. When the attachment processing component 202C converts the attachments, the converted attachment is preferably compressed in size and may be encrypted. The packaging of the attachments, if needed, is accomplished as discussed above. Advantageously, the processing and overhead associated with conversions from a plurality of attachment formats to one or more common formats compatible with the mobile device 214B is accomplished at the host system 202.

Having described in detail the preferred embodiments of the present invention, including the preferred methods of operation, it is to be understood that this operation could be carried out with different elements and steps. This preferred embodiment is presented only by way of example and is not meant to limit the scope of the present invention which is defined by the following claims.

What is claimed is:

1. A method of redirecting e-mail messages and message attachments from a mail system to a mobile data communication device, the method comprising:

detecting a data item including an e-mail message and a message attachment by a redirector component associated with the mail system;

processing the data item for sending a first portion of the data item to the mobile data communication device via a wireless network;

receiving a command message from the mobile data communication device at the redirector component requesting more of the data item and receiving from the mobile data communication device an address of an attachment displayer that is in a local area of the mobile data communication device; and sending a second portion of the data item including the message attachment to the attachment displayer in response to the command message.

2. The method as recited in claim 1, wherein the processing the data item further comprises separating the e-mail message and the message attachment.

3. The method as recited in claim 2, wherein the sending a first portion of the data item further comprises sending a portion of the e-mail message and information about the message attachment to the mobile data communication device.

4. The method as recited in claim 3, wherein the sending a portion of the e-mail message and information about the message attachment further comprises sending at least one of file name, file size and file type of the message attachment to the mobile data communication device.

5. A system for redirecting e-mail messages and message attachments from a mail system to a mobile data communication device, the system comprising:

means for detecting a data item including an e-mail message and a message attachment upon arrival of the data item at the mail system;

means for processing the data item in order for sending a first portion of the data item to the mobile data communication device via a wireless network;

means for receiving a command message from the mobile data communication device requesting more of the data item;

means for receiving from the mobile data communication device an address of an attachment displayer that is in a local area of the mobile data communication device; and means for sending a second portion of the data item including the message attachment to the attachment displayer in response to the command message.

6. The system as recited in claim 5, wherein the means for processing the data item further comprises means for separating the e-mail message and the message attachment.

7. The system as recited in claim 6, wherein the means for sending a first portion of the data item further comprises means for sending a portion of the e-mail message and information about the message attachment to the mobile data communication device.

8. The system as recited in claim 7, wherein the means for sending a portion of the e-mail message and information about the message attachment further comprises means for sending at least one of file name, file size and file type of the message attachment to the mobile data communication device.

9. The system as recited in claim 5, further comprising means for sending the second portion of the data item including the message attachment to the mobile data communication device.

10. The system as recited in claim 5, further comprising means for instructing the mobile data communication device to detect availability of attachment displayers in the local area of the mobile data communication device.

11. The system as recited in claim 5, further comprising means for notifying the mobile data communication device of availability of the message attachment at the attachment displayer.

12. The system as recited in claim 5, wherein the means for receiving the address of the attachment displayer further comprises means for receiving at least one format type compatible with the attachment displayer.

13. The system as recited in claim 12, further comprising means for converting the attachment to a format compatible with the attachment displayer prior to sending the attachment to the attachment displayer.

14. The method as recited in claim 1, further comprising sending the second portion of the data item including the message attachment to the mobile data communication device.

15. The method as recited in claim 1, further comprising instructing the mobile data communication device to detect availability of attachment displayers in the local area of the mobile data communication device.

16. The method as recited in claim 1, further comprising notifying the mobile data communication device of availability of the message attachment at the attachment displayer.

17. The method as recited in claim 1, wherein receiving the address of the attachment displayer further comprises receiving at least one format type compatible with the attachment displayer.

18. The method as recited in claim 17, further comprising converting the attachment to a format compatible with the local attachment displayer prior to sending the attachment to the attachment displayer.

* * * * *

UNITED STATES PATENT AND TRADEMARK OFFICE
CERTIFICATE OF CORRECTION

PATENT NO.        : 8,050,661 B2
APPLICATION NO.   : 11/925754
DATED             : November 1, 2011
INVENTOR(S)       : Gary P. Mousseau and Mihal Lazaridis It is certified that error appears in the above-identified patent and that said Letters Patent is hereby corrected as shown below:

Column 1,
Line 12, "data" should read --Data--.

Column 1,
Line 24, "following, and" should read --following, co-pending and--.

Column 20,
Lines 39 and 40, "with the local attachment" should read --with the attachment--.

Signed and Sealed this
Twentieth Day of March, 2012

David J. Kappos
*Director of the United States Patent and Trademark Office*